United States Patent
Makita

(10) Patent No.: US 7,522,801 B2
(45) Date of Patent: Apr. 21, 2009

(54) SEMICONDUCTOR DEVICE AND SEMICONDUCTOR DEVICE MANUFACTURING METHOD

(75) Inventor: Tsuyoshi Makita, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/783,839

(22) Filed: Apr. 12, 2007

(65) Prior Publication Data
US 2007/0280587 A1 Dec. 6, 2007

(30) Foreign Application Priority Data
Apr. 14, 2006 (JP) .......................... P2006-112354

(51) Int. Cl.
*G02B 6/36* (2006.01)
*G02B 6/12* (2006.01)

(52) U.S. Cl. ........................................ 385/129; 385/14
(58) Field of Classification Search .................. 385/14, 385/129
See application file for complete search history.

(56) References Cited

U.S. PATENT DOCUMENTS

| | | | | |
|---|---|---|---|---|
| 5,998,781 | A * | 12/1999 | Vawter et al. | 250/227.11 |
| 6,345,138 | B1 * | 2/2002 | Kawai et al. | 385/49 |
| 2001/0012306 | A1 * | 8/2001 | Yamazaki | 372/43 |
| 2005/0253045 | A1 * | 11/2005 | Oda | 250/208.1 |
| 2006/0115230 | A1 * | 6/2006 | Komoguchi et al. | 385/146 |
| 2007/0104411 | A1 * | 5/2007 | Ahn et al. | 385/14 |

FOREIGN PATENT DOCUMENTS

JP 2005-101090 A 4/2005

* cited by examiner

*Primary Examiner*—K. Cyrus Kianni
(74) *Attorney, Agent, or Firm*—Birch, Stewart, Kolasch & Birch, LLP

(57) ABSTRACT

A semiconductor device is provided and includes a substrate, a photoelectric converting portion, a plurality of optical waveguide portions stacked above the photoelectric conversion portion, each of the plurality of optical waveguide portions including a translucent material and being shaped in a taper.

16 Claims, 5 Drawing Sheets

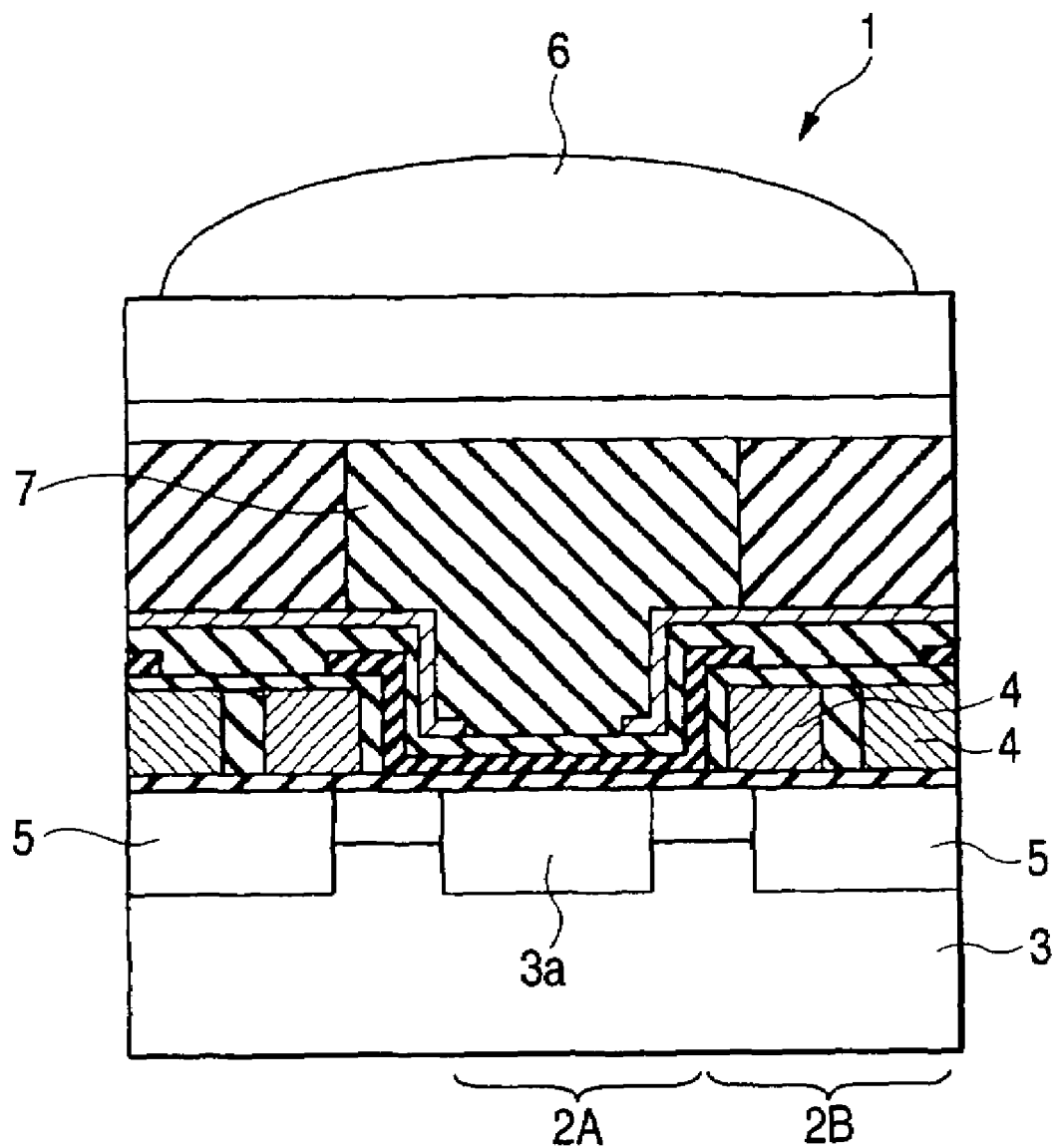

SEMICONDUCTOR DEVICE AND SEMICONDUCTOR DEVICE MANUFACTURING METHOD

BACKGROUND OF THE INVENTION

1. Field of the Invention

The present invention relates to a semiconductor device and a semiconductor device manufacturing method and, more particularly, a semiconductor device which is suitable for a metal wiring-stacked structure used for miniaturization of a sensor, high-speed drive, Logic integration, or the like, whose converging effect for converging a light to a photoelectric converting portion is high and whose sensitivity is good, and a semiconductor device manufacturing method.

2. Description of Related Art

As the semiconductor device in the related art, for example, there is a solid state imaging device having the structure shown in FIG. 5. A solid state imaging device 1 has a photoelectric converting portion 2A in which a photodiode 3a is formed on a substrate 3, a charge transferring portion 2B having a charge transfer electrode 4 above the charge transfer channel 5, and a microlens 6 formed on a surface on the light receiving side of the solid state imaging device 1. The solid state imaging device 1 has such an optical waveguide structure that an irradiation light is converged by the microlens 6, passed through a columnar translucent film 7 formed below the microlens 6, and received by the photodiode 3a (see JP-A-2005-101090, for example).

By the way, since the metal wiring-stacked structure is needed in the case of sensor miniaturization, high-speed drive, Logic integration, or the like, the layers of the solid state imaging device 1 should be designed largely. However, in case a thickness of the upper layer on the substrate 3 is increased, it was difficult to form the translucent film 7 acting as an optical waveguide member long in the stacking direction. Also, when the translucent film 7 should be formed long in the stacking direction, a cavity called a void might be easily generated in an inside of the translucent film 7.

SUMMARY OF THE INVENTION

An object of an illustrative, non-limiting embodiment of the invention is to provide a semiconductor device which is suitable for a solid state imaging device with a layered structure, whose converging effect for converging a light to a photoelectric converting portion is high, and whose sensitivity is good, and a semiconductor device manufacturing method.

The above object of the present invention can be achieved by following configurations.

(1) A semiconductor device comprising: a substrate; a photoelectric converting portion; and a plurality of optical waveguide portions stacked above the photoelectric conversion portion, each of the plurality of optical waveguide portions comprising a translucent material and being shaped in a taper.

(2) The semiconductor device as described in (1) above, wherein each of the plurality of optical waveguide portions has a sectional area reducing gradually toward the substrate.

(3) A method of manufacturing a semiconductor device comprising a substrate and a photoelectric converting portion, the method comprising stacking a plurality of layers above the photoelectric converting portion, the each of the plurality of layers comprising a wiring portion, an interlayer insulating film, and a tapered optical waveguide portion comprising a translucent material.

(4) The method of manufacturing a semiconductor device as described in (3) above, wherein the tapered optical waveguide portion in each of the plurality of layers has a sectional area reducing gradually toward the substrate.

(5) The method of manufacturing a semiconductor device as described in (3) or (4) above, wherein the optical waveguide portion in each of the plurality of layers is formed by: patterning and etching the interlayer insulating film to make an opening in the interlayer insulating film; and embedding the translucent material into the opening.

BRIEF DESCRIPTION OF THE DRAWINGS

The features of the invention will appear more fully upon consideration of the exemplary embodiments of the inventions, which are schematically set forth in the drawings, in which:

FIG. 5 is a sectional view showing a structure of a solid state imaging device in the related art.

DETAILED DESCRIPTION OF THE EXEMPLARY EMBODIMENTS

Although the invention will be described below with reference to the exemplary embodiment thereof, the following exemplary embodiment and its modification do not restrict the invention.

Since a semiconductor device according to an exemplary embodiment of the present invention is constructed by stacking a plurality of optical waveguide portions above the photoelectric converting portion, a light incident on the light receiving surface is transmitted from the upper layer side of the stacked optical waveguide portions to the lower layer side (toward a substrate of the device) and is guided to the photoelectric converting portion. By doing this, in the case of miniaturization of the sensor, high-speed drive, Logic integration, or the like, even though thicknesses of the layers on the substrate are increased, the optical waveguide portions of respective layers are formed every wiring portion such as the contact, the metal wiring, or the like. Therefore, an incident light can be passed through the optical waveguide portions of respective layers and guided to the photoelectric converting portion without fail. Also, it is not needed to set a dimension in the stacking direction long. Also, in respective manufacturing steps, it can be prevented that a cavity called a void is generated in the inside of the translucent member.

Preferably a plurality of optical waveguide portions may be formed respectively such that a sectional area is reduced gradually toward the lower side. By doing this, when a light incident on the upper optical waveguide portion is transmitted to the lower optical waveguide portion, such light never interferes with a boundary portion between the optical waveguide portion and the interlayer insulating film, and it can be prevented that a light converging power is deteriorated.

According to an exemplary embodiment of the present invention, the semiconductor device, which is suitable for the semiconductor device with the layered structure, whose converging effect for converging a light to the photoelectric converting portion is high, and whose sensitivity is good, and the semiconductor device manufacturing method can be provided.

An exemplary embodiment of the present invention will be explained in detail with reference to the drawings hereinafter. In the present embodiment, explanation will be made by illustrating a solid state imaging device as the semiconductor device, but explanation may be made by referring to a CMOS image sensor.

Figure 1:
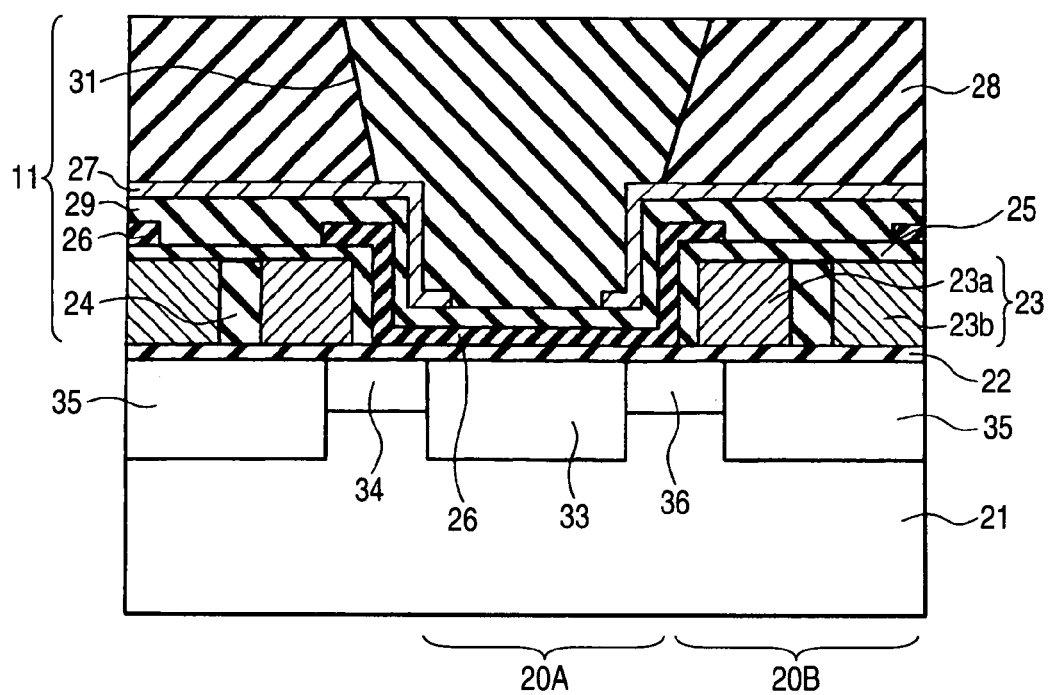
FIG. 1 is a sectional view of a part of a structure of a solid state imaging device according to an exemplary embodiment of the invention.
Figure 2:
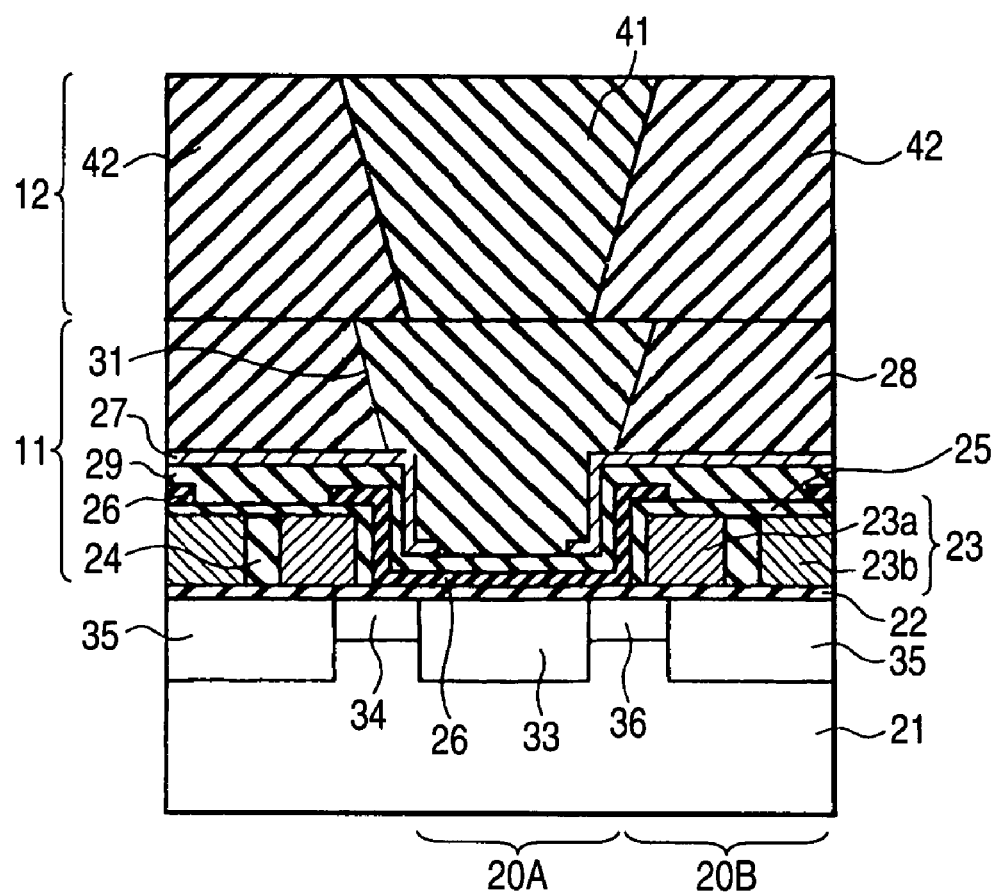
FIG. 2 is a sectional view explaining a part of steps of manufacturing a solid state imaging device.
Figure 3:
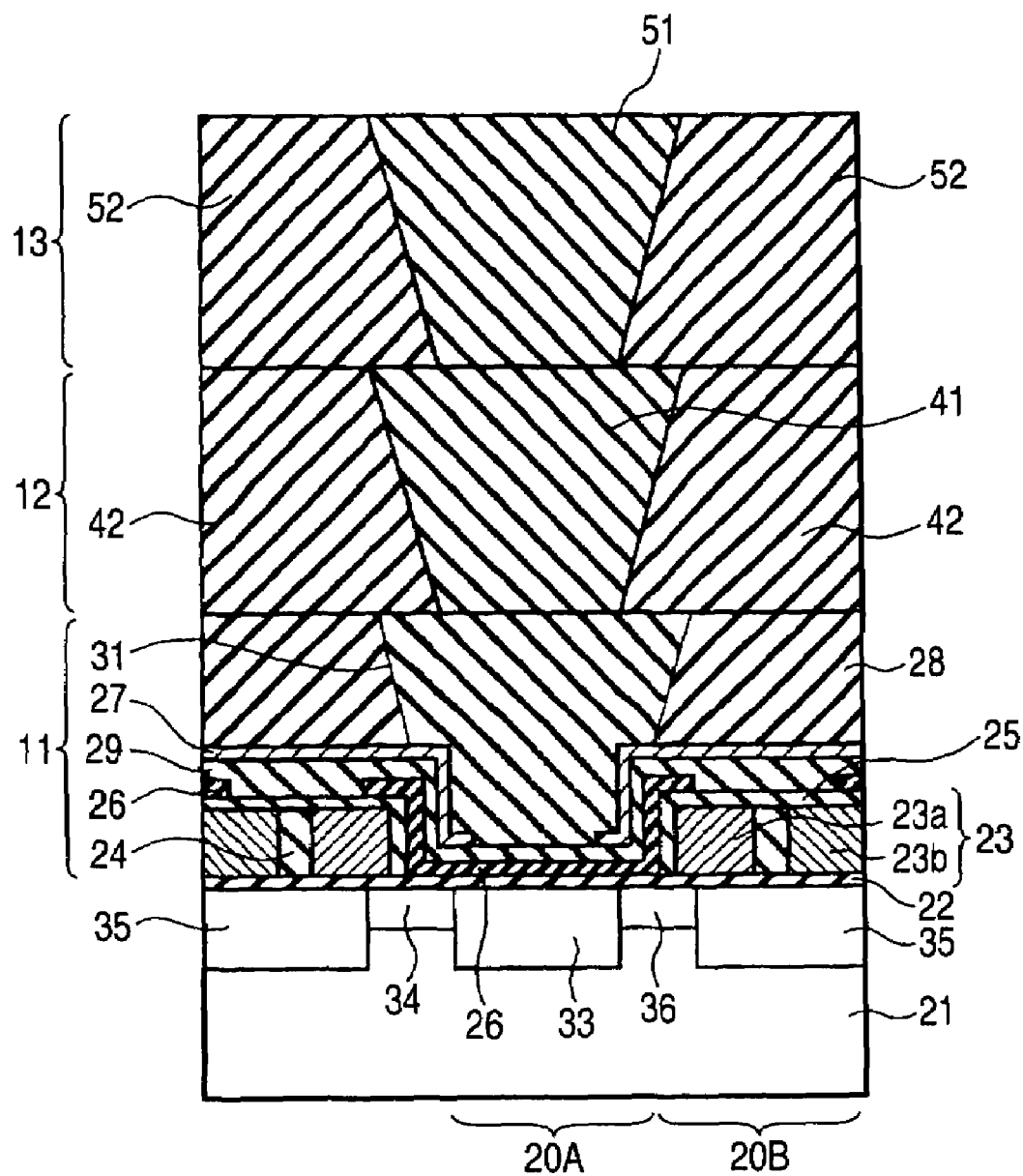
FIG. 3 is a sectional view explaining a part of steps of manufacturing a solid state imaging device.
Figure 4:
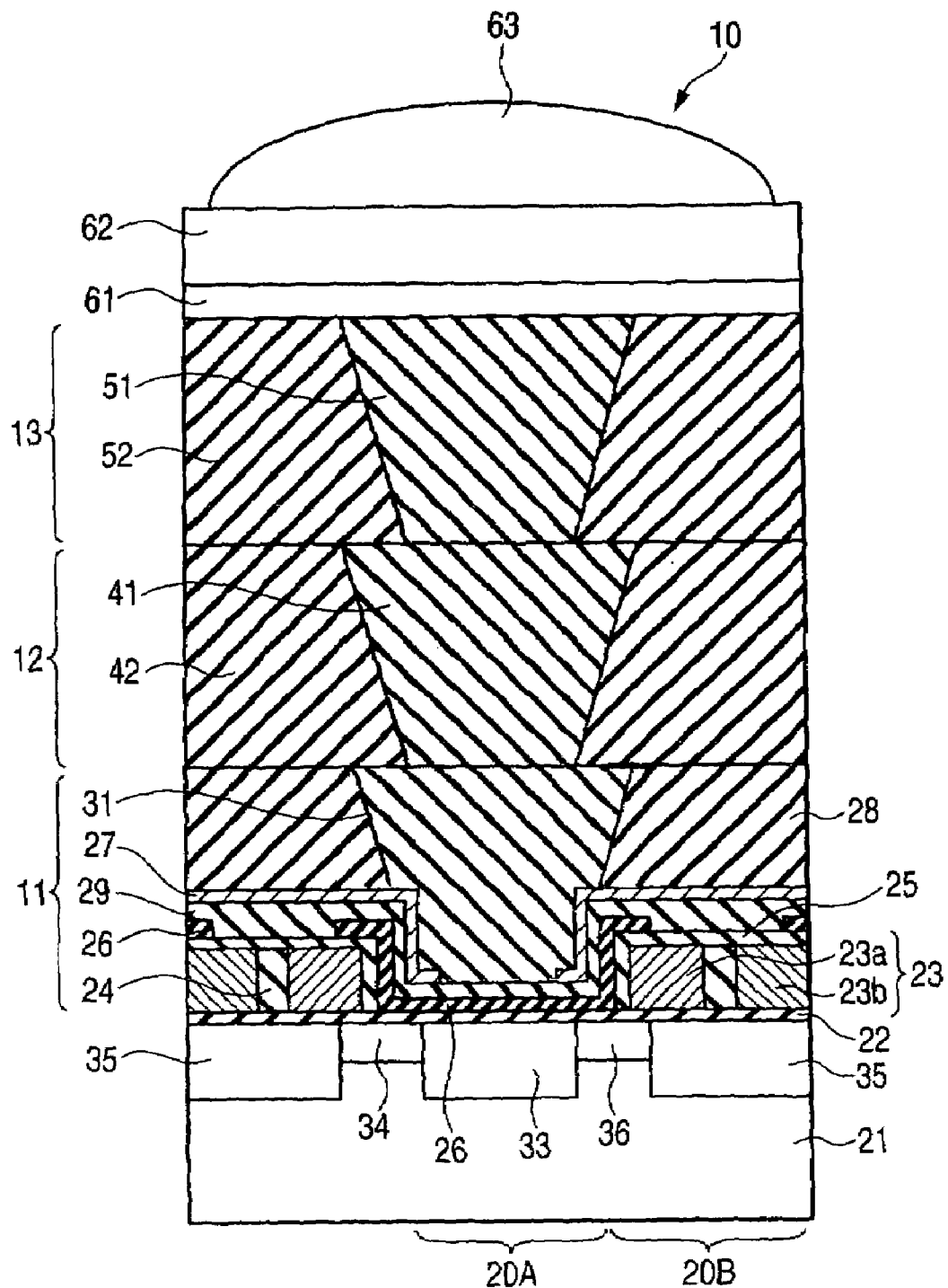
FIG. 4 is a sectional view showing a solid state imaging device according to an exemplary embodiment of the invention.

FIG. 1 is a sectional view explaining a part of a structure of a solid state imaging device of the present embodiment. FIGS. 2 and 3 are sectional views explaining a part of steps of manufacturing the solid state imaging device of the present embodiment. FIG. 4 is a sectional view showing the solid state imaging device of the present embodiment.

A solid state imaging device of the present embodiment has a waveguide structure that has a photoelectric converting portion, charge transfer electrodes for transferring charges generated by the photoelectric converting portion, and an optical waveguide for confining an incident light and propagating the light to the photoelectric converting portion on a substrate.

A p-well and an n-type semiconductor layer (not shown) are formed on a surface of a silicon substrate 21 as a semiconductor substrate. A plurality of photodiodes 33 each having a p-n junction, charge transfer channels 35, a channel stop region 36, and a charge reading region 34 are formed in the substrate 21.

Photodiode portions 20A formed of a plurality of photodiodes 33 are formed in the silicon substrate 21. Charge transferring portions 20B for transferring signal charges sensed by the photodiodes 33 are provided between the photodiode portions 20A. The charge transfer channels 35 for transferring the signal charges are provided to the charge transferring portions 20B.

A gate oxide film 22 is formed on the silicon substrate 21. Also, a plurality of charge transfer electrodes 23 (23a, 23b) are formed on the gate oxide film 22. In the charge transfer electrode 23, a first electrode 23a and a second electrode 23b are arranged at a gap mutually in a single layer. The first electrode 23a and the second electrode 23b are formed separately such that these electrodes are electrically isolated by inter-electrode insulating films 24 that are formed at an interval on the gate oxide film 22.

Here, the gate oxide film 22 can be constructed as a three-layered film that includes a silicon oxide film formed by a thermal oxidation, a silicon nitride film formed by a low pressure CVD method, and a HTO film (high temperature oxide film) formed by a CVD method.

A silicon nitride film 26 is formed on the charge transfer electrode 23 via a silicon oxide film 25. A HTO film 29 is formed on the silicon nitride film 26. The HTO film 29 is used to form a path that supplies hydrogen to the photodiodes 33 in a sintering process. For this purpose, an opening for passing hydrogen in a sintering process is formed in the silicon nitride film 26 on the charge transfer electrode 23.

Also, a light shielding film 27 having openings in light receiving areas above the photodiode portions 20A as the photoelectric converting portions is formed. An optical waveguide portion 31 formed of the translucent material, which is made of a silicon oxide film or a silicon nitride film and has a columnar structure, is formed above the photodiode portions 20A via the silicon nitride film 26 and the HTO film 29. An interlayer insulating film 28 is formed on the light shielding film 27. Here, as the procedures of forming the optical waveguide portion 31, the light shielding film 27 is formed on the HTO film 29, and then the interlayer insulating film 28 is formed thereon. Then, a planarizing process is applied to an upper surface of the interlayer insulating film 28 by a means such as a reflow method by using a heat treatment, an etching-back method, a CMP method, or the like. Then, an opening into which the translucent material is buried is formed by patterning the interlayer insulating film 28 by means of a photolithography step and then etching this film. Then, the optical waveguide portion 31 is formed by embedding the translucent material into this opening. The optical waveguide portion 31 has an almost tapered shape such that a sectional area on the lower side is formed smaller than that on the upper side.

As shown in FIG. 1, in the present embodiment, respective layers from the optical waveguide portion 31 to the interlayer insulating film 28 formed above the gate insulating film on the substrate 21 are set as a first layer 11. Also, the solid state imaging device according to the present invention is constructed by stacking a layer in which another optical waveguide portion is formed on such layer.

Next, procedures of stacking layers in which the optical waveguide is formed will be explained with reference to FIGS. 2 and 3 hereunder. Here, in following explanation of the present embodiment, the interlayer insulating film 28 in the first layer 11 is assumed as a first interlayer insulating film and also the optical waveguide portion 31 is assumed as a first optical waveguide portion.

Wiring portions such as contacts, metal wirings, and the like of the solid state imaging device, which is for the second layer 12 are formed. As shown in FIG. 2, a second interlayer insulating film 42 is formed on the first layer 11. An opening in which the translucent material is buried is formed by planarizing an upper surface of the second interlayer insulating film 42 like the planarizing process for the first interlayer insulating film 28, patterning the second interlayer insulating film 42 by the photolithography step, and etching this film. At this time, this opening is formed in such a way that the opening is in communication with an upper surface of the first optical waveguide portion 31 of the first layer 11 and an area of the opening is smaller than the upper surface of the first optical waveguide portion 31.

Then, a second optical waveguide portion 41 is formed by embedding the translucent material into the opening of the second interlayer insulating film 42. Like the first optical waveguide portion 31 of the first layer 11, the second optical waveguide portion 41 has an almost tapered shape such that a sectional area on the lower side is formed smaller than that on the upper side. In this manner, a second layer 12 consisting of the second optical waveguide portion 41 and the second interlayer insulating film 42 is stacked on the first layer 11.

Similarly, in case a third layer 13 is tacked on the second layer 12, at first wiring portions such as contacts, metal wirings, and the like of the solid state imaging device, which is for the third layer 13, are formed. Then, as shown in FIG. 3, a third interlayer insulating film 52 is formed on the second layer 12. An opening in which the translucent material is buried is formed by planarizing an upper surface of the third interlayer insulating film 52 like the planarizing process for the first interlayer insulating film 28, patterning the third interlayer insulating film 52 by the photolithography step, and etching this film. At this time, this opening is formed in such a way that the opening is in communication with an upper surface of the second optical waveguide portion 41 of the second layer 12 as the underlying layer and an area of the opening is smaller than the upper surface of the second optical waveguide portion 41.

Then, a third optical waveguide portion 51 is formed by embedding the translucent material into the opening of the third interlayer insulating film 52. Like the first optical waveguide portion 31 and the second optical waveguide portion 41, the third optical waveguide portion 51 has an almost tapered shape such that a sectional area on the lower side is formed smaller than that on the upper side. In this manner, the third layer 13 consisting of the third optical waveguide portion 51 and the third interlayer insulating film 52 is stacked on the second layer 12.

As shown in FIG. 4, after the first layer 11, the second layer 12, and the third layer 13 are formed, a silicon nitride film 61 is formed on the third layer 13 by the plasma CVD method and then a planarized film 62 composed of a translucent organic film is formed on the silicon nitride film 61. Then, a convex microlens 63 is formed on the planarized film 62. In this manner, the solid state imaging device 10 is completed.

A light that is irradiated onto the microlens 63 of the solid state imaging device is focused on the third optical waveguide portion 51 while being converged, then passed through sequentially the third optical waveguide portion 51, the second optical waveguide portion 41, and the first optical waveguide portion 31 downward in FIG. 4, and then received by the photodiode 33 on the substrate 21.

Here, by way of example, the solid state imaging device 10 of the present embodiment is constructed by stacking three layers of the first layer 11, the second layer 12, and the third layer 13 such that the first optical waveguide portion 31, the second optical waveguide portion 41, and the third optical waveguide portion 51 are stacked on the photoelectric converting portion 20A. In this event, the structure of the solid state imaging device 10 is not limited to a three-layered stacked structure. For example, a structure in which only two layers are stacked may be employed, or a structure in which layers having four optical waveguide portions or more may be employed.

As shown in the above embodiment, since the solid state imaging device 10 of the present invention is constructed by stacking a plurality of optical waveguide portions 31, 41, 51 above the photoelectric converting portion 20A, a light incident on the light receiving surface is transmitted from the upper layer side of the stacked optical waveguide portions 31, 41, 51 to the lower layer side and is guided to the photoelectric converting portion 20A. By doing this, in the case of miniaturization of the sensor, high-speed drive, Logic integration, or the like, even though thicknesses of the layers on the substrate 2i are increased, the optical waveguide portions 31, 41, 51 of respective layers 11, 12, 13 are formed every wiring portion such as the contact, the metal wiring, or the like. Therefore, an incident light can be passed through the optical waveguide portions 31, 41, 51 of respective layers 11, 12, 13 and guided to the photoelectric converting portion 20A without fail. Also, since it is not needed to set a dimension in the laminating direction long, the translucent material can be embedded surely in the openings of the interlayer insulating films 28, 42, 52 in respective manufacturing steps of the optical waveguide portions 31, 41, 51 and it can be prevented that a cavity called a void is generated in the inside of the translucent member.

In this case, the present invention is not limited to the above embodiment, and adequate changes, improvements, and the like can be applied.

This application claims foreign priority from Japanese Patent Application No. 2006-112354, filed Apr. 14, 2006, the entire disclosure of which is herein incorporated by reference.

What is claimed is:

1. A semiconductor device comprising:
    a substrate;
    a photoelectric converting portion; and
    a plurality of optical waveguide portions stacked above the photoelectric conversion portion, each of the plurality of optical waveguide portions comprising a translucent material and being shaped in a taper,
    wherein an optical waveguide portion covers said photoelectric converting portion, and
    wherein a high temperature oxide film is used to form a path that supplies hydrogen to said photoelectric converting portion in a sintering process, and an opening for passing hydrogen is formed in a silicon nitride film.

2. The semiconductor device according to claim 1, wherein each of the plurality of optical waveguide portions has a sectional area reducing gradually toward the substrate.

3. The semiconductor device according to claim 1, wherein a light incident on a light receiving surface of said semiconductor device is transmitted from an upper layer side of said stacked optical waveguide portions to a lower layer side and is guided to said photoelectric converting portion.

4. The semiconductor device according to claim 1, wherein optical waveguide portions of said plurality of portions are formed in a wiring portion of said device.

5. The semiconductor device according to claim 1, wherein a lower surface of each of said stacked optical waveguide portions is smaller than an upper surface of an optical waveguide portion located directly underneath.

6. The semiconductor device according to claim 1, wherein said semiconductor device is a solid state imaging device or a CMOS image sensor.

7. The semiconductor device according to claim 1, further comprising a gate oxide film constructed as a three-layered film that includes a silicon oxide film formed by a thermal oxidation, a silicon nitride film formed by a low pressure CVD method, and a high temperature oxide film formed by a CVD method.

8. The semiconductor device according to claim 1, wherein said each of said optical waveguide portions are surrounded by an interlayer insulating film.

9. The semiconductor device according to claim 1, further comprising a light shielding film having an opening above said photoelectric portion, wherein one of said stacked optical waveguide portions contacts said light shielding film.

10. The semiconductor device according to claim 1, further comprising a light shielding film having an opening above said photoelectric portion, wherein one of said stacked optical waveguide portions covers said opening in said light shielding film.

11. The semiconductor device according to claim 1, further comprising:
    a light shielding film having an opening above said photoelectric portion, wherein one of said stacked optical waveguide portions contacts said light shielding film,
    the high temperature oxide film formed underneath light shielding film, and
    the silicon nitride film formed underneath said high temperature oxide film.

12. The semiconductor device according to claim 1, wherein said translucent material is silicon oxide or silicon nitride.

13. The semiconductor device according to claim 1, further comprising a silicon nitride film, formed by a plasma CVD method, on the optical waveguide portion located furthest from said substrate.

14. The semiconductor device according to claim 1, wherein said plurality of optical waveguide portions includes only two stacked portions.

15. The semiconductor device according to claim 1, wherein said plurality of optical waveguide portions includes three or more stacked portions.

16. The semiconductor device according to claim 1, wherein optical waveguide portions of said plurality of portions are formed in every wiring portion of said device.

* * * * *